United States Patent
Orr et al.

(10) Patent No.: US 7,397,416 B2
(45) Date of Patent: Jul. 8, 2008

(54) POLICE RADAR/LASER DETECTOR WITH INTEGRAL VEHICLE PARAMETER DISPLAY USING A VEHICLE INTERFACE

(75) Inventors: Steven K. Orr, Cincinnati, OH (US); John Kuhn, Cincinnati, OH (US); Jeffrey J. Clawson, Loveland, OH (US)

(73) Assignee: Escort Inc., West Chester, OH (US)

(*) Notice: Subject to any disclaimer, the term of this patent is extended or adjusted under 35 U.S.C. 154(b) by 131 days.

(21) Appl. No.: 11/466,963

(22) Filed: Aug. 24, 2006

(65) Prior Publication Data

US 2006/0284756 A1    Dec. 21, 2006

Related U.S. Application Data

(60) Division of application No. 11/010,104, filed on Dec. 10, 2004, now Pat. No. 7,098,844, which is a division of application No. 10/610,367, filed on Jun. 30, 2003, now Pat. No. 6,836,238, which is a continuation-in-part of application No. 10/022,820, filed on Dec. 17, 2001, now Pat. No. 6,614,385, and a continuation-in-part of application No. 09/973,623, filed on Oct. 9, 2001, now Pat. No. 6,587,068, which is a continuation-in-part of application No. PCT/US00/16410, filed on Jun. 14, 2000.

(60) Provisional application No. 60/145,394, filed on Jul. 23, 1999, provisional application No. 60/139,097, filed on Jun. 17, 1999.

(51) Int. Cl.
*G01S 7/40* (2006.01)

(52) U.S. Cl. ............... 342/20; 342/52; 342/53; 342/54; 342/104; 342/115; 340/936

(58) Field of Classification Search ............... 342/20, 342/52–55, 56–58, 104, 115; 340/905, 936
See application file for complete search history.

(56) References Cited

U.S. PATENT DOCUMENTS

| | | | |
|---|---|---|---|
| 3,856,991 A | 12/1974 | Kirkland, Jr. et al. | 179/1 P |
| 4,257,273 A | 3/1981 | Knowd | 73/647 |
| 4,347,573 A | 8/1982 | Friedland | 364/453 |

(Continued)

FOREIGN PATENT DOCUMENTS

JP    63275913    11/1988

(Continued)

OTHER PUBLICATIONS

"Cobra Electronics Once Again Leads Radar Detection Market, Debuting Its Exclusive SmartMute Products at Retailers Nationwide", PR Newswire. New York:Apr. 1, 2002. p. 1.*

(Continued)

*Primary Examiner*—John B Sotomayor
(74) *Attorney, Agent, or Firm*—Wood, Herron & Evans, LLP

(57) ABSTRACT

Calibration of an acceleration detector is initiated by a user depressable button such as a button indicating a vehicle is at rest and/or by the detector reading an OBDII vehicle communication protocol to determine the condition of the vehicle. Calibration permits more accurate measurements in a vehicle performance test.

50 Claims, 7 Drawing Sheets

U.S. PATENT DOCUMENTS

| | | | | |
|---|---|---|---|---|
| 4,413,522 A | 11/1983 | Leatherwood et al. | ......... | 73/646 |
| 4,424,511 A | 1/1984 | Alberts, Jr. | ................... | 73/646 |
| 4,467,651 A | 8/1984 | Peters et al. | .................. | 73/497 |
| 4,492,952 A | 1/1985 | Miller | ........................ | 340/52 |
| 4,539,642 A | 9/1985 | Mizuno et al. | .............. | 364/426 |
| 4,581,769 A | 4/1986 | Grimsley et al. | ............ | 455/226 |
| 4,631,542 A | 12/1986 | Grimsley | .................... | 342/20 |
| 4,829,441 A | 5/1989 | Mandle et al. | ................ | 702/96 |
| 4,876,527 A | 10/1989 | Oka et al. | ................... | 340/441 |
| 4,908,767 A | 3/1990 | Scholl et al. | ................ | 364/453 |
| 4,954,828 A | 9/1990 | Orr | .............................. | 342/20 |
| 4,986,385 A | 1/1991 | Masaki | ....................... | 180/179 |
| 5,038,102 A | 8/1991 | Glasheen | .................... | 324/175 |
| 5,049,885 A | 9/1991 | Orr | .............................. | 342/20 |
| 5,058,698 A | 10/1991 | Yoshida et al. | .............. | 180/179 |
| 5,079,553 A | 1/1992 | Orr | .............................. | 342/20 |
| 5,127,487 A | 7/1992 | Yamamoto et al. | .......... | 180/179 |
| 5,134,406 A | 7/1992 | Orr | .............................. | 342/20 |
| 5,153,512 A | 10/1992 | Glasheen | .................... | 324/175 |
| 5,164,729 A | 11/1992 | Decker et al. | ................. | 342/20 |
| 5,177,685 A | 1/1993 | Davis et al. | ................ | 364/443 |
| 5,206,500 A | 4/1993 | Decker et al. | ............... | 250/214 |
| 5,243,544 A | 9/1993 | Schoess | ...................... | 364/566 |
| 5,250,951 A | 10/1993 | Valentine et al. | ............. | 342/20 |
| 5,300,932 A | 4/1994 | Valentine et al. | ............. | 342/20 |
| 5,305,007 A | 4/1994 | Orr et al. | ....................... | 342/20 |
| 5,347,120 A | 9/1994 | Decker et al. | ............... | 250/214 |
| 5,365,055 A | 11/1994 | Decker et al. | ............... | 250/214 |
| 5,400,034 A | 3/1995 | Smith | ......................... | 342/103 |
| 5,429,736 A | 7/1995 | Shimada et al. | ............. | 204/406 |
| 5,450,329 A | 9/1995 | Tanner | ....................... | 364/449 |
| 5,457,982 A | 10/1995 | Spies et al. | .................... | 73/1 D |
| 5,496,979 A | 3/1996 | Behr | ................... | 200/61.45 M |
| 5,504,482 A | 4/1996 | Schreder | ..................... | 340/995 |
| 5,510,793 A | 4/1996 | Gregg, III et al. | ............. | 342/20 |
| 5,515,042 A | 5/1996 | Nelson | ........................ | 340/937 |
| 5,539,645 A | 7/1996 | Mandhyan et al. | .......... | 364/438 |
| 5,559,508 A | 9/1996 | Orr et al. | ..................... | 340/902 |
| 5,574,211 A | 11/1996 | Shimada et al. | ................ | 73/1 D |
| 5,668,554 A | 9/1997 | Orr et al. | ....................... | 342/20 |
| 5,717,398 A | 2/1998 | Pollin | ........................... | 342/20 |
| 5,753,793 A | 5/1998 | Lindahl et al. | ................ | 73/1.15 |
| 5,796,655 A | 8/1998 | Reed et al. | ............. | 365/185.22 |
| 5,805,079 A | 9/1998 | Lemelson | .............. | 340/870.05 |
| 5,815,092 A | 9/1998 | Gregg, III et al. | ........... | 340/936 |
| 5,929,753 A | 7/1999 | Montague | .................... | 340/426 |
| 5,955,973 A | 9/1999 | Anderson | ................... | 340/988 |
| 5,977,884 A | 11/1999 | Ross | ........................... | 340/936 |
| 5,983,161 A | 11/1999 | Lemelson et al. | ........... | 701/301 |
| 6,023,236 A | 2/2000 | Shelton | ....................... | 342/104 |
| 6,084,510 A | 7/2000 | Lemelson et al. | ........... | 340/539 |
| 6,118,403 A | 9/2000 | Lang | ...................... | 342/357.09 |
| 6,154,166 A | 11/2000 | Sawada et al. | .............. | 342/175 |
| 6,201,493 B1 | 3/2001 | Silverman | ................... | 342/20 |
| 6,202,027 B1 | 3/2001 | Alland et al. | ................ | 701/301 |
| 6,204,798 B1 | 3/2001 | Fleming, III | .................. | 342/20 |
| 6,252,544 B1 | 6/2001 | Hoffberg | ................. | 342/357.1 |
| 6,378,354 B1 | 4/2002 | Sharp | ........................ | 73/1.16 |
| 6,474,683 B1 | 11/2002 | Breed et al. | ................. | 280/735 |
| 6,480,103 B1 | 11/2002 | McCarthy et al. | ......... | 340/425.5 |
| 6,587,068 B2 * | 7/2003 | Kuhn et al. | ................... | 342/20 |
| 6,614,385 B2 * | 9/2003 | Kuhn et al. | ................... | 342/51 |
| 6,640,609 B1 | 11/2003 | Nadkarni et al. | ............. | 73/1.37 |
| 2002/0113727 A1 * | 8/2002 | Kuhn et al. | ................... | 342/20 |
| 2003/0067407 A1 * | 4/2003 | Kuhn et al. | ................... | 342/20 |
| 2006/0055583 A1 * | 3/2006 | Orr et al. | ....................... | 342/20 |
| 2006/0284756 A1 * | 12/2006 | Orr et al. | ....................... | 342/20 |

FOREIGN PATENT DOCUMENTS

| | | |
|---|---|---|
| JP | 9037096 | 1/1997 |
| JP | 2000137089 | 5/2000 |
| WO | WO 97/08839 | 3/1997 |

OTHER PUBLICATIONS

"Cobra Electronics Awarded Four Prestigious Innovations Awards for 2002 Products", PR Newswire. New York:Jan. 3, 2002, p. 1.*

Terratrip—Rally Computers Product Information (with manuals), http://www.terratrip.com, (Jul. 16, 2002), 11 pages.

Small Systems Specialists, *The ALFA-Pro Dual Odometer/Clock*, ALFA-Pro Rally Odometer owners manual, http://rally.cc/prmanual.htm, (Jul. 12, 2002), 10 pages.

Small Systems Specialists, *Using Your Car's Vehicle Speed Sensor*, ALFA Checkpoint Rally Clock—Instruction manual, http://rally.cc/subaru.htm, (Jun. 3, 2002), 2 pages.

Weinberg, Harvey, *Embedding Temperature Information in the ADXL202's PWM Outputes*, Technical Note, One Technology Way, Aug. 14, 1998 (Rev. A), 2 pages.

Weinberg, Harvey, *Using the ADXL202 Duty Cycle Output*, Technical Note, One Technology Way, Aug. 15, 1998 (Rev. A), 4 pages.

Halir, et al., *Numerically Stable Direct Least Squares Fitting of Ellipses*, Institute of Information Theory and Automation Library; Academy of Sciences of Czech Republic; Nov. 25, 2002 (Last Update), 8 pages.

Murakami Shinichi, *Speed Excess Alarming Device*, Abstract, Japanese Publication No. 09-027096, Published Jan. 28, 1997.

Begin, John D., *Calibration of orthogonal sensor suite*, U.S. Publication No. US-2002-0100310 A1 dated Aug. 2002; Application filed Apr. 2001.

Hanse, Joel G., *Self-calibrating inertial measurement system method and apparatus*, US Publication No. US-20003-0084704 A1 dated May 2003; Application filed Nov. 2001.

Yin Kun Peng; Golnaraghi, M.F., *A vector-based gyro-free inertial navigation system by integrating existing accelerometer network in a passenger vehicle*, PLANS 2004, 26-29; Apr. 2004; pp. 234-242.

Kim et al., *Two novel radar vehicle detectors for the replacement of a conventional loop detector*, Microwave Journal Euro-Global Edition, Jul. 2001, vol. 44, No. 7, ps. 22, 26-28, 32, 35, 38 and 40.

* cited by examiner

POLICE RADAR/LASER DETECTOR WITH INTEGRAL VEHICLE PARAMETER DISPLAY USING A VEHICLE INTERFACE

CROSS REFERENCE TO RELATED APPLICATIONS

This application is a divisional application of U.S. application Ser. No. 11/010,104, filed Dec. 10, 2004, now U.S. Pat. No. 7,098,844 which is a divisional of U.S. application Ser. No. 10/610,367, filed Jun. 30, 2003, now U.S. Pat. No. 6,836,238, which is a continuation-in-part application of U.S. application Ser. Nos. 09/973,623 now U.S. Pat. No. 6,587,068 and 10/022,820 now U.S. Pat. No. 6,614,385 filed Oct. 9, 2001 and Dec. 17, 2001, respectively. application Ser. No. 10/022,820 is a continuation-in-part of PCT Application designating the U.S. Ser. No. PCT/US00/16410, filed Jun. 14, 2000, the U.S. National Phase of which was assigned U.S. application Ser. No. 09/889,656 on Mar. 15, 2002, when all 35 U.S.C § 371 requirements were met. PCT Application Ser. No. PCT/US00/16410, filed Jun. 14, 2000, is a United States continuation-in-part of U.S. Provisional Patent Application Ser. No. 60/139,097, filed Jun. 14, 1999, and a United States continuation-in-part of U.S. Provisional Patent Application Ser. No. 60/145,394, filed Jul. 23, 1999. Each of the above mentioned prior applications is hereby fully incorporated herein by reference.

FIELD OF THE INVENTION

The present invention relates generally to police radar/laser detectors, and more particularly, to displays for police radar/laser detectors that utilize a vehicle interface.

BACKGROUND OF THE INVENTION

Police traffic surveillance devices emit an electromagnetic signal in the radio frequency (RF) band or light band (i.e., infrared, visible, and ultraviolet light) that reflect off of approaching or departing vehicles to determine their speed. In particular, a change in frequency (Doppler shift) or a change in time of travel for return signal pulses is sensed for calculating vehicle speed.

Police radar and laser detectors ("detectors") are used by drivers of vehicles to detect radiant electromagnetic signals characteristic of police traffic surveillance devices. In particular, the following RF (radar) frequency bands are used: X-band (10.525 GHz±25 MHz); K-band (24.150 GHz±100 MHz); and Ka-band (34.700 GHz±1300 MHz). Furthermore, laser wavelength of 904 nm with 33 MHz bandwidth is also used. These detectors are generally a detachable device clipped to a visor or dash of the vehicle for unimpeded sensing of the signals and for providing a conveniently positioned display and one or more controls to the driver. While police radar/laser detectors successfully provide alerts to the driver, generally during significant portions of time there are no alerts to be made. Consequently, the display capabilities of the detector are generally limited to displaying the operating mode ("pilot mode") of the detector. In addition to the under-utilized display, detectors increasingly use digital signal processors for processing received electromagnetic signals that operate faster with additional data and program storage capabilities. Consequently, the processing capacity of the detectors is also under-utilized much of the time. For example, detectors spend less than two percent of their operating time alerting the user of received electromagnetic signals.

Taking advantage of the unused capacity of a detector would increase its value. For instance, many drivers would benefit from the display of other sensed conditions associated with their vehicle. However, sensor displays integral to the vehicle instrument panel are either expensive or unavailable for certain models. Using after-market displays is inconvenient and tends to clutter the interior of the vehicle. Consequently, drivers often forego incorporating additional displays for sensed conditions.

Most cars and light trucks on the road today have on-board diagnostic (OBD) systems. In an effort to met Environmental Protection Agency (EPA) emission standards, manufacturers started using electronic engine management to control engine functions and diagnose engine problems during the 1970's and early 1980's. Through the years, on-board diagnostic systems came into being and have recently become more sophisticated. OBDII, a standard introduced in the mid-1990's, provides almost complete engine control and monitoring of other parts of the vehicles including the chassis, body and accessory devices, as well as providing a diagnostic control network for the vehicle.

The origin of these systems dates to 1966 when, in an effort to reduce smog in the Los Angeles Basin, the State of California began requiring emission controls on 1966 model cars. Later, in 1968, the federal government extended these controls nationwide. In 1970, Congress passed the Clean Air Act and established the Environmental Protection Agency (EPA). In doing so, Congress charged the EPA with reducing emissions from cars and trucks. The EPA then promulgated a series of emission standards for motor vehicles to meet this mandate. These standards were graduated, becoming ever more stringent on vehicle emissions with time. Further, manufacturers were required to maintain the vehicle within the emission standards for the useful life of the vehicle.

Manufacturers, in an effort to meet these standards, introduced electronic engine management systems that control engine ignition and fuel delivery. These systems included sensors for monitoring various engine parameters. The ignition and fuel delivery are adjusted based on sensor readings so that vehicles comply with the emission standards. Access to these sensors for diagnostic purposes was also provided.

In the beginning each automotive manufacturer had its own engine management system and used signals commensurate with their system. Finally, in 1988, the Society of Automotive Engineers (SAE), established a set of standards for a connector plug and a set of diagnostic test signals. The EPA adapted most of these standards established by the SAE regarding on-board diagnostic programs, as well as some other recommendations. OBDII is an expanded set of standards and practices developed by SAE and adopted by the California Air Resources Board (CARB) and the EPA. The deadline for implementation of OBDII was Jan. 1, 1996.

Manufacturers began incorporating OBDII standards into various models as early as 1994, although some of these early vehicles were not completely compliant with OBDII standards. However, all vehicles manufactured since Jan. 1, 1996 are compliant with the OBDII standard. OBDII provides a universal inspection and diagnosis method to ensure the vehicle is performing to original equipment manufacturer (OEM) standards. A scanner console or tool is connected to the OBDII connector to inspect and diagnose the vehicle.

There are currently three basic protocols in use, each with minor variations on the communication pattern between the on-board diagnostic computer and the scanner console or tool. While there have been some manufacturer changes between protocols in the past few years, as a rule of thumb, Daimler Chrysler products and all European and most Asian imports use International Standards Organization (ISO) 9141 circuitry. General Motors uses SAE J1850 VPW (Variable Pulse Width Modulation), and Ford Motor Company uses SAE J1850 PWM (Pulse Width Modulation) communication patterns.

It is also possible to tell which protocol is used on a specific automobile by examining the dash connector socket. If the connector has a pin in the #7 position and no pin at #2 or #10, then the vehicle has the ISO 9141 protocol. If no pin is present in the #7 position, the vehicle uses a SAE protocol. If there are pins in positions #7 and #2 and/or #10, the vehicle may still use the ISO protocol. While there are three OBDII electrical connection protocols, the command set is fixed according to the SAE J1979 standard.

Pre-OBDII cars had connectors in various positions under the dashboard and hood. However, as part of the standard, all OBDII vehicles have a connector located in the passenger compartment, easily accessible from the driver's seat. Often, the connector is located under the dash or behind or near the ashtray. A cable is plugged into the OBDII J1962 connector and connected to a scanner console or scan tool. This equipment ranges from a simple hand-held meter that provides a coded readout of the various diagnostic functions, up to a large console computer-based unit costing thousands of dollars.

These large units are compatible with all cars and contain software that analyzes the signals received from the car, displays a text or diagrammed readout of any malfunctions found and suggests possible solutions to the problems.

Smaller units for the home or small shop technician can provide a variety of levels of data, some approaching the sophistication of the big shop consoles. However, they are usually limited to one OBDII system type, unless adapters can be purchased.

OBDII signals are most often sought in response to a "Check Engine Light" appearing on the dashboard or driveability problems experienced with the vehicle. The data provided by OBDII can often pinpoint the specific component that has malfunctioned, saving substantial time and cost compared to guess-and-replace repairs. Scanning OBDII signals can also provide valuable information on the condition of a used car.

There are other methods to gather data from a vehicle other than using OBDII. One method involves the development of the Intelligent Vehicle Data Bus (IVDB). The IVDB allows all computers within a vehicle to communicate with each other, and potentially makes data used or held by those computers available across the IVDB.

Therefore, a significant need exists for a police radar/laser detector that incorporates additional sensing and display of conditions associated with a vehicle, as well as other vehicle data such as that gathered using an on-board diagnostic system or intelligent vehicle data bus.

SUMMARY OF THE INVENTION

The present invention addresses these and other problems in the prior art by providing a police radar/laser detector that senses and displays a vehicle parameter, such as a sound pressure level, acceleration, etc. During those periods when the detector is not required to alert the driver of a police traffic surveillance device, the detector is configured to provide additional valuable information to the driver. Moreover, the present invention provides a method of operating a police radar/laser detector that utilizes data available from a vehicle on-board diagnostic system or intelligent vehicle data bus.

Consistent with a first aspect of the invention, a detector and method of using a detector include a receiver that receives an electromagnetic signal emitted by a police traffic surveillance device. A controller responds to the received electromagnetic signal by initiating a visual and/or audible alert. The controller also responds to a sensed vehicle parameter by displaying the parameter when the alert is not present.

Consistent with a second aspect of the invention, a detector similarly responds to sensed electromagnetic signal by initiating an alert. Advantageously, the detector includes a sensor for sensing sound pressure or acceleration. A controller is responsive to the sensor to display sound pressure or acceleration.

Consistent with a third aspect of the present invention, a detector is configured to read speed data available through an OBDII interface or IVDB and adjust the sensitivity of the detector to law enforcement signals based on the speed data.

Consistent with a fourth aspect of the present invention, a detector is configured to read speed data available through an OBDII interface or IVDB and using an internal clock, calculate a 0 to 60 mile per hour or a quarter mile time for display.

Consistent with a fifth aspect of the present invention, a detector is configured to read speed data available through an OBDII interface or IVDB and function as a speedometer.

Consistent with a sixth aspect of the present invention, a detector is configured to read engine revolutions per minute (rpm) data available through an OBDII interface or IVDB and function as a tachometer.

Consistent with a seventh aspect of the present invention, a detector is configured to allow a user to enter a shift point based on engine rpm, read engine rpm data available through an OBDII interface or IVDB, and provide an indication to the user based on a comparison of the engine rpm data and the shift point.

Consistent with an eighth aspect of the present invention, a detector is configured to read an OBDII vehicle communication protocol and display diagnostic trouble codes.

Consistent with an ninth aspect of the present invention, factory calibration for a detector including an accelerometer is provided.

Consistent with a tenth aspect of the present invention, calibration of a detector including an accelerometer is initiated by a user depressable button or by the detector reading an OBDII vehicle communication protocol.

Consistent with an eleventh aspect of the present invention, the loudness of a warning indicative of law enforcement activity is varied based on a sensed vehicle parameter.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
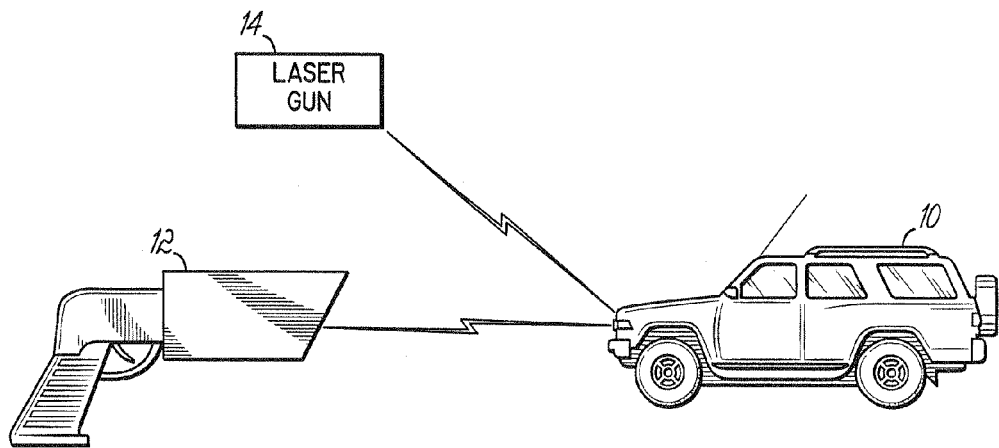
FIG. 1 is an illustration of a vehicle receiving signals from law enforcement agencies.

Turning to the drawings, wherein like parts have like numbers throughout the several views, FIG. 1 illustrates a vehicle 10 in operation on a roadway, under exposure to signals from a variety of sources. For example, as further illustrated, vehicle 10 is under exposure to a radar signal from a law enforcement radar, such as a radar gun 12. Vehicle 10 is also under exposure to a laser signal from a law enforcement laser gun 14. In accordance with principles of the present invention, vehicle 10 is equipped with an on-board diagnostic (OBD) system that complies with OBDII standards. The vehicle 10, further includes radar/laser detector capable of interfacing with the OBDII system. The detector is able to use vehicle information or data available through the OBDII system to provide enhanced functionality and additional features.

Alternatively, vehicle 10 may be equipped with an Intelligent Vehicle Data Bus (IVDB). When so equipped, the vehicle 10 includes a detector capable of interfacing with the IVDB to provide enhanced functionality and additional features.

Figure 2:
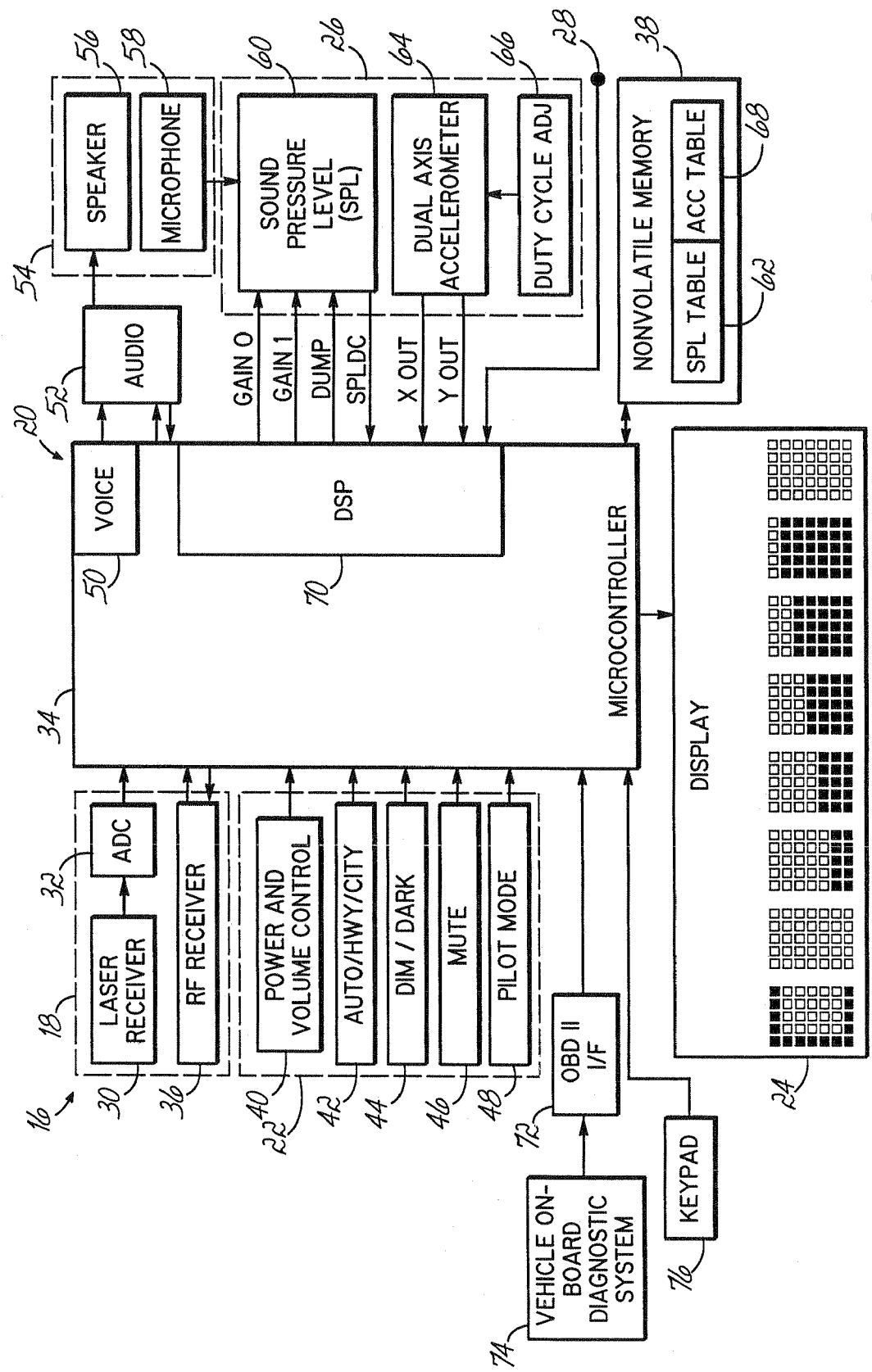
FIG. 2 is a block diagram of a police radar/laser detector incorporating vehicle parameter sensing of sound pressure and acceleration and utilizing data available from a vehicle on-board diagnostic system.

Turning now to FIG. 2, a radar/laser detector 16 for use in a vehicle such as a car or truck is illustrated. In particular, the detector 16 includes a front end portion 18 for receiving radiant electromagnetic signals (e.g., radar, laser) in frequency bands characteristically used by police traffic surveillance devices. The received signals are demodulated for processing by a back end portion 20.

A user selects processing options through controls 22. The back end portion 20 responds by confirming selected options and results of processing on a display 24. In the illustrative embodiment, an alphanumeric dot matrix display (LED) is used for displaying alphanumeric and bar graph representations, in a manner described in U.S. Pat. No. 5,668,554, the disclosure of which is expressly incorporated herein by reference. The detector 16 also includes a vehicle sensor 26 for sensing a vehicle parameter. Alternatively or in addition to, a vehicle sensor connection 28 may be coupled to remote sensors in or on the vehicle to sense the same or other vehicle parameters.

In the illustrative embodiment, the detector 16 is configured to sense both radar (i.e. radio frequency, or RF, signals) and laser signals. Thus, the front end 18 has a laser receiver 30 that senses illumination by a laser. The general operation of the laser receiver 30 is described in U.S. Pat. No. 5,206,500, the disclosure of which is expressly incorporated herein by reference. The received laser signal is converted to an analog electrical voltage that is converted to a digital value by an analog-to-digital converter (ADC) 32. Examples of an ADC include, but are not limited to, a comparator and multi-bit converter. For example, when a comparator is used, the laser signal may be converted into a pulse train. The digital value is input to a microcontroller 34 such as the 68HC908GP32 microprocessor manufactured by Motorola.

The front end portion 18 receives signals with an RF receiver 36. The microcontroller 34 performs digital signal processing on the input signals received from the front end portion 18, storing values and control settings in nonvolatile memory 38. The general operation of the RF receiver 36 and microcontroller 34 is described in U.S. Pat. No. 4,313,216; U.S. Pat. No. 4,581,769; U.S. Pat. No. 4,954,828; U.S. Pat. No. 5,049,885; U.S. Pat. No. 5,079,553; and U.S. Pat. No. 5,305,007, the disclosures of which are expressly incorporated herein by reference.

The controls 22 include a power and volume control rotary dial 40. An "AUTO/HWY/CITY" button 42 toggles a sensitivity setting for the RF receiver 36 between automatic, highway, and city settings. A "dim/dark" button 44 toggles the brightness level of the display between a daylight setting, a dim setting, and a dark mode wherein only audible alerts are used. A mute button 46 disables a current audible alert. In addition, a pilot mode button 48 is advantageously added to sequence through various operating modes.

The microcontroller 34, or controller, advantageously includes sufficient processing capability to incorporate voice circuitry 50 that generates verbal alerts that are amplified by an audio driver 52 for broadcast by an audio interface 54, in particular a speaker 56. The audio interface 54 provides sound pressure sensing by either a separate microphone 58 or by alternating use of the speaker 56 as a microphone and a speaker. The sensed sound pressure signal from the microphone 58 is received by sound pressure level (SPL) circuitry 60 of the vehicle sensor 26. The SPL circuitry 60 amplifies and outputs a peak level DC analog signal ("SPLDC") to the microcontroller 34. The controller 34 converts the SPLDC to a corresponding SPL in dB by referencing an SPL lookup table 62 stored in memory 38.

The vehicle sensor 26 also includes a dual axis accelerometer 64, which produces longitudinal and lateral acceleration signals (X OUT, Y OUT). Each acceleration signal has an overall period set by a duty cycle adjustment 66. The acceleration causes a positive logic pulse to vary the duty cycle of the acceleration signal. For a given period, a duty cycle sensed in the acceleration signal may be converted to the corresponding acceleration, or G, by use of an acceleration lookup table 68, stored in memory 38. As an alternative to using the duty cycle adjustment 66 to correct the period of the acceleration signal to match the table 68, it will be appreciated that a correction may be implemented as a software calculation by the controller 34. For example, a duty cycle may be converted to actual force, in G. using equations relating velocity, acceleration, time, and distance, which may be found hereinafter. Moreover, such equations may be based on tabled coefficients.

In the illustrative embodiments, the accelerometer 64 comprises a 2-axis acceleration sensor on a single IC chip, e.g., model ADXL202E accelerometer manufactured by Analog Devices of Norwood, Mass. Other accelerometers, including one-axis accelerometers may be used in the alternative.

The outputs of dual axis accelerometer 64 are analog voltage or digital signals whose duty cycles, e.g., ratio of pulse-width to period, are proportional to acceleration. The duty cycle may be directly measured by controller 34, without an Analog-to-Digital (A/D) converter or glue logic in this embodiment. Those skilled in the art will appreciate that in other embodiments of the present invention, using other accelerometers, an A/D converter or glue logic may be required.

In accordance with another aspect of the present invention, factory calibration of radar/laser detector 16 for dual axis accelerometer 64 may be provided. Factory calibration eliminates the need for user calibration of the accelerometer 64 in the field prior to engaging in a performance measurement, while providing for more accurate measurements.

Dual axis accelerometer 64 in radar/laser detector 16 may be factory calibrated by manipulating the detector 16 to rotate the dual axis accelerometer 64. The rotation is performed with dual axis accelerometer's 64 X-Y plane oriented such that the Earth's gravitational force is perpendicular to the plane formed by the X and Y axes. Thus, in the instance where the accelerometer 64 is perfectly calibrated, the forces along the X and Y axes experienced by the accelerometer 64 would strike a perfect circle on the X-Y coordinate plane with a radius equal to 1 G. However, due to error in both X/Y gains and offsets, the actual result is an ellipse whose center is generally not at the origin of the X-Y plane.

In operation, radar/laser detector 16 is placed in a "factory calibration state," meaning that controller 34 is executing the necessary program code, as will be readily apparent to one of skill in the art with the benefit of the instant disclosure, for the calibration of dual axis accelerometer 64. During such a factory calibration, dual axis accelerometer 64 is rotated as described and measures and feeds real time X and Y measurements to a Least Squares Elliptical Fit algorithm executed by controller 34. One paper that describes the use of a Least Squares Elliptical Fit algorithm is entitled "Numerically Stable Direct Least Squares Fitting of Ellipses" by Radim Halir and Jan Flusser, and may be found online at:

http://autotrace.sourceforge.net/W(SCG98.pdf, and is hereby incorporated by reference in its entirety.

It will be appreciated that many algorithms have been developed for finding an ellipse given a set of (X,Y) coordinates. One such method is referred to as "Fitzgibbon's Approach", and Fitzgibbon's Approach may be used in the embodiment described herein.

During the rotation, the coordinate values are used to populate the scatter matrix, as described in "Numerically Stable Direct Least Squares Fitting of Ellipses" by Radim Halir and Jan Flusser for Fitzgibbon's Approach. Thus, once dual axis accelerometer 64 has been rotated at least 360 degrees and the scatter matrix populated, Fitzgibbon's Approach may be used to solve for the equation of the ellipse, giving its center and major and minor axes. The center and the major and minor axes may then be used to correct for error in both X/Y gains and offsets of dual axis accelerometer 64. For example, it has been found that after calibration, accelerometer 64 may measure 1 G+/−0.005 G, providing no temperature change is experienced.

Changes in temperature may also effect the shape and position of the ellipse. For example, Analog Devices ADXL202E lists a specification of +/−2 mG/degree-C for temperature variation. To correct for variations in temperature, a temperature sensor may be incorporated.

For example, during factory calibration, accelerometer 64 may be subjected to as many as twenty different temperatures across a range of temperatures. For each temperature, accelerometer 64 is rotated, coordinate values are generated and used to populate the scatter matrix, and the equation of the ellipse, giving its center and major and minor axes. The parameters of each ellipse is then stored in non-volatile memory, such as memory 38. During normal use of radar/laser detector 16, the temperature from the sensor is read, e.g., approximately every 15 seconds, and the two ellipses which are closest in value are used with linear interpolation to provided real time calibration parameters. Such a procedure eliminates the need for user calibration of the accelerometer 64 in the field prior to engaging in a performance measurement, while providing for more accurate measurements.

The microcontroller 34 incorporates DSP input/out (I/O) circuitry 70 for receiving the analog signals SPLDC, X OUT, Y OUT from the vehicle sensor 26. The DSP I/O 70 also controls the SPL circuitry 60 by setting a gain level (1-4) via gain signals Gain 0, Gain 1. The DSP I/O 70 also controls the peak level refresh rate with a dump signal to the SPL circuitry 60.

The detector 16 further includes an interface 72, such as an OBDII compliant interface, for connection to on-board vehicle diagnostic systems 74 that are built into a vehicle 10. In order to comply with Environmental Protection Agency (EPA) mandates, manufacturers of vehicles have included engine management systems with standardized information systems using the so-called OBDII standard interface. Connectivity with the vehicle through the OBDII interface is available through a port, or connector, commonly located in the passenger compartment, easily accessible from the driver's seat. Often, the connector is located under the dash or behind or near the ashtray. The standard interface is described in "On-Board Diagnostics for Light and Medium Duty Vehicles Standards Manual," 1999 Edition, available through the Society of Automotive Engineers, Inc. The controller 34, using the OBDII standard interface 72, can obtain vehicle speed and other vehicle status information directly from the vehicle, and then may use this information as described in more detail below.

Alternatively, vehicle 10 may be equipped with IVDB. When so equipped, detector 16 includes an IVDB interface so that controller 34 can obtain vehicle information and access other vehicle computer systems. Such systems may include, but are not limited to: global positioning systems (GPS) and central display systems, often located in the dash of the vehicle.

Current vehicle speed is one of the parameters that is available through the OBDII interface or IVDB. This data can be read and used to provide a variety of features in detectors. One such feature may be referred to as a "variable sensitivity mode." Variable sensitivity mode varies the sensitivity of a detector based on vehicle speed. For example, when a vehicle is traveling below a certain speed, 25 mph for example, the sensitivity of the detector would be set to a minimum value. The detector would still be capable of detecting a very strong signal, but weaker signals would be ignored. As the speed of the vehicle increased, the sensitivity of the detector would be increased, until a speed is reached where there no longer is a reduction in sensitivity. This might be in the 45 to 50 mph range.

Similarly, speed data may be used to disable a laser shifter. For example, if a vehicle is traveling below a given speed, e.g., 25 miles per hour, a user selected speed, or a speed limit, a laser shifter may be disabled.

Another feature of the present invention allows a detector 16 to function as a speedometer. In this feature, program code stored in memory, such as memory 38, is configured to process vehicle speed data available from an OBD system 74 or IVDB for display, such as on display 24.

Another feature of the present invention allows a detector 16 to function as a tachometer. Here, program code stored in memory is configured to process engine revolution per minute (rpm) data available from an OBD system 74 or IVBD for display on display 24.

Another feature of the present invention allows a user to receive a shift indication. Program code stored in memory is configured to allow a user to input shift points based on engine rpm through a keypad, such as keypad 76. The program code then facilitates a comparison between the user entered shift point and engine rpm data available from an OBD system 74 or IVDB, and based on the comparison, provides an indication to a user on display 24.

Another feature of the present invention allows a detector 16 to be used to display error codes available from a vehicle 10 OBD system 74. In this feature, a program is configured so as to cause OBDII interface 72 to emulate a scanner console or tool, as is well known in the art. The program then displays the error or diagnosis trouble codes on display 24.

Another feature of the present invention allows a user to initiate a vehicle performance test, by depressing a button, e.g., pilot mode button 48, indicating to the detector 16 that the vehicle 10 is at rest, or not moving. Alternatively, the detector 16 may access data available from a vehicle 10 OBD system 74 to determine whether the vehicle is moving.

Yet another feature allows a detector 16 to adjust the loudness of a warning indicative of police traffic surveillance devices based on the sensing of a vehicle parameter, e.g., sound pressure level.

Figure 3:
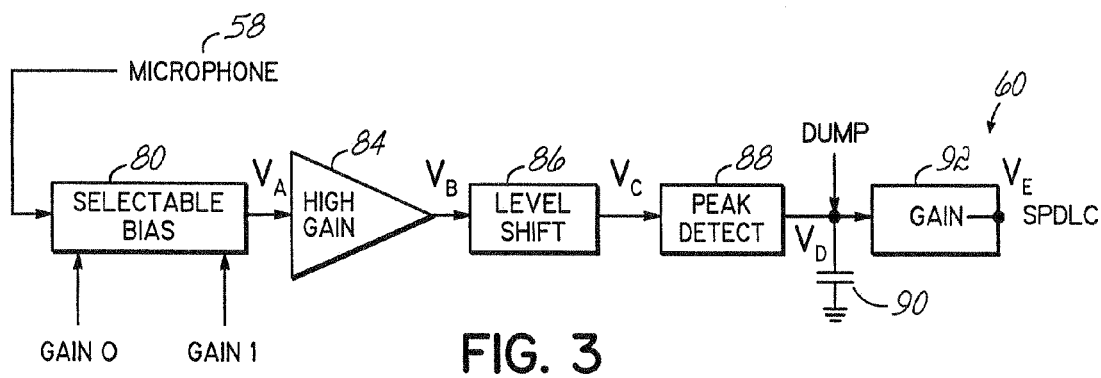
FIG. 3 is a block diagram of the sound pressure level circuitry referenced in FIG. 2.
Figure 3A:
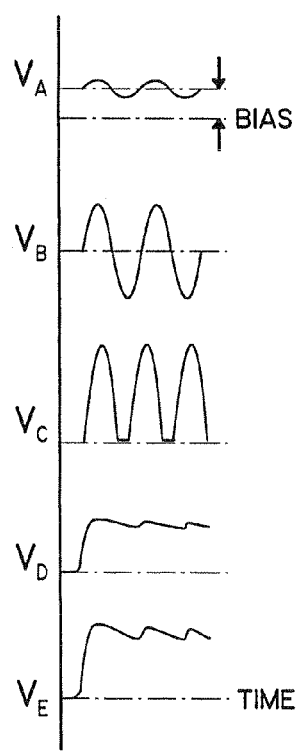
FIG. 3A is a series of voltage plots as a function of time for various nodes depicted in FIG. 3.

Referring to FIG. 3, the SPL circuitry 60 is depicted in block diagram form, with intermediate voltage values $V_A$-$V_E$ illustrated in FIG. 3A. In order to obtain a wide acoustic range in SPL sensing, the SPL circuitry 60 begins with a selectable bias circuit 80. One of four bias levels is selectable (Gain 0, Gain 1=00, 01, 10, 11), so that a biased voltage signal $V_A$ is maintained within the input range of a high gain circuit 84 to produce an amplified voltage signal $V_B$. A level shift circuit 86 positively biases the amplified voltage signal $V_B$ to level shifted voltage signal $V_C$ as a first step in converting the high frequency AC signal to a lower frequency signal for digital signal processing. A peak detect circuit 88 low pass filters the signal $V_C$ to a peak level voltage signal $V_D$. To compensate for a gain loss, a double gain circuit 92 increases the amplification of the signal $V_D$ to an approximately DC voltage signal $V_E$, or SPLDC. A peak hold circuit is provided by a capacitor 90 coupled between the $V_D$ node and ground. Thereby, additional low pass filtering of the peak level voltage signal $V_D$ is provided, periodically reset by the DUMP signal.

Figure 4:
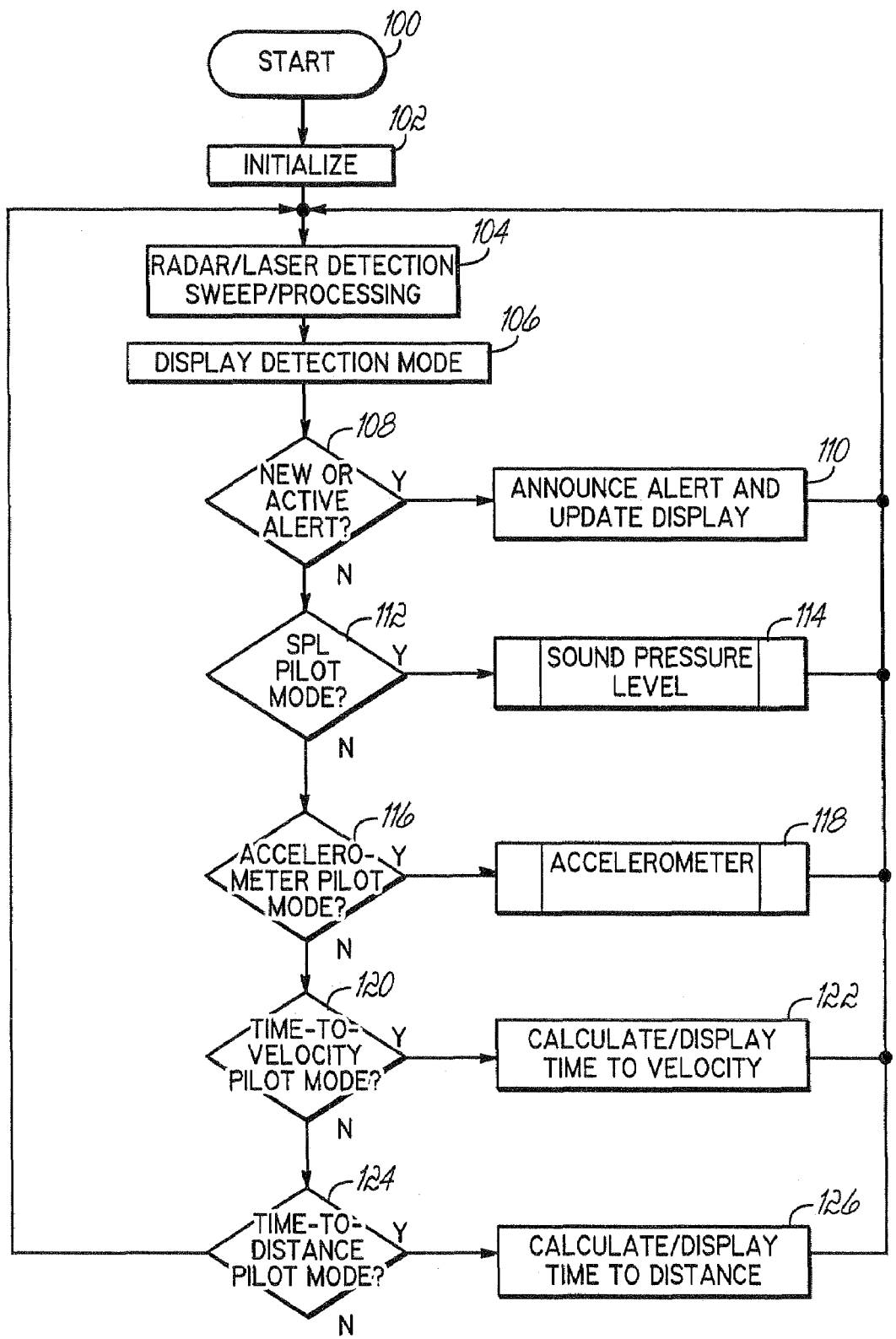
FIG. 4 is a flow chart for a sequence of operations performed by the detector FIG. 3 for initiating alerts and for displaying sensed vehicle parameters.

Referring to FIG. 4, a sequence of operations, depicted as routine 100, is performed by the detector 16 of FIG. 2 for detection and vehicle parameter sensing. During power-up or activation of the pilot mode button, initialization is performed wherein a current pilot mode is read from memory or accepted from the controls (block 102). Routine 100 then enters into a repetitive cycle wherein sweeps and processing are performed for each frequency range characteristic of radiant electromagnetic signals for a police traffic surveillance device (block 104). In addition to sweep processing, the detection mode is displayed (block 106).

If a new or active alert is detected in block 108, then the alert is audibly announced, if enabled, and displayed (block 110). Control returns to block 104, ignoring vehicle parameter sensing. However, it will be appreciated that some applications may continue sensing and displaying a vehicle parameter along with the alert.

If no new or active alert was detected in block 108, then a determination is made as to whether SPL pilot mode is selected (block 112). If so, a sound pressure level routine 114 is performed and processing returns to block 104. If not SPL mode in block 112, then a determination is made as to whether the accelerometer pilot mode is selected (block 116). If so, an accelerometer routine is performed (block 118) and processing returns to block 104. If not accelerometer pilot mode in block 116, then a determination is made as to whether a time-to-velocity pilot mode (e.g. 0-to-60 time) has been selected (block 120). If so, the velocity is calculated by integrating the X OUT acceleration signal (block 122). In particular, the longitudinal acceleration is sampled at very short time intervals and the area under the curve is calculated. The velocity is then calculated using the equation $V=VO+at$, where V is current velocity, VO is velocity determined from the previous sample, a is acceleration, and t is time. The total sample time is monitored until the target velocity is reached. Alternatively, with each new sample from the accelerometer, the velocity value may be updated based on the equation: velocity(new)=velocity(old)+k×(average of the last two force measurements)×($\Delta T$), where $\Delta T$ is the elapsed time between the old and new samples. $\Delta T$ may also vary and may be determined by the frequency of a VCO in the accelerometer. The start time for integration may be based by detecting a significant acceleration after a button push. Alternatively, a velocity signal may be received via the external sensor connection.

If not in time-to-velocity pilot mode in block 122, then a determination is made as to whether time-to-distance pilot mode (e.g., quarter mile time) is selected (block 124). If so, distance is calculated and displayed by twice integrating the longitudinal acceleration signal X OUT (block 126). In particular, the acceleration is measured and velocity is calculated during each sample interval as previously described. Then, distance X is calculated using the equation $X=XO+VO\times t+\frac{1}{2}a t^2$, where XO is the distance determined from the previous sample. The total sample time is monitored until the target distance is reached. Alternatively, and again, the expression velocity(new)=velocity(old)+k×(average of the last two force measurements)×($\Delta T$) may also be used to calculate distance. If not in time-to-distance pilot mode in block 126 or after block 126, processing returns to block 104.

Figure 5:
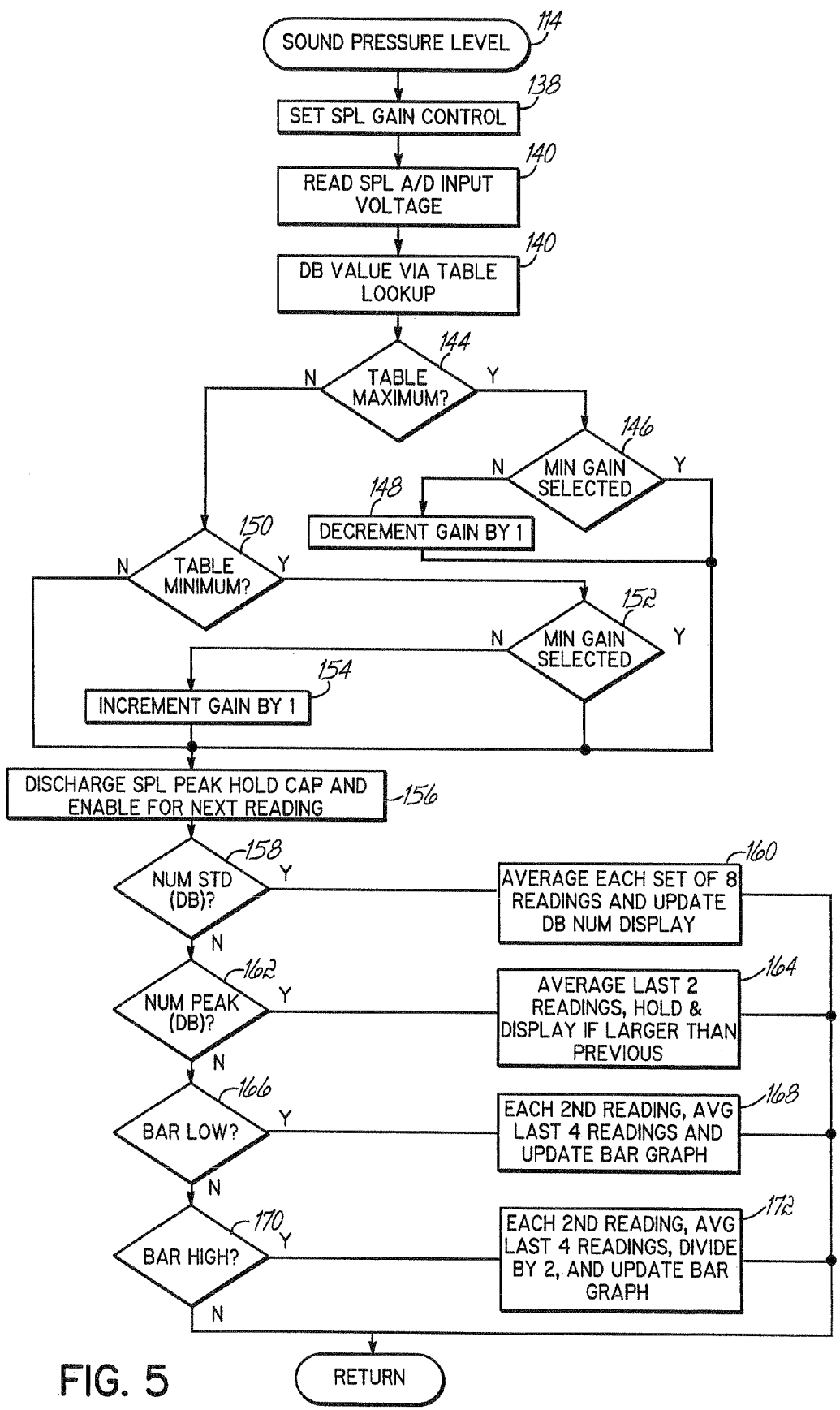
FIG. 5 is a flow chart for the sequence of operation for sound pressure level display referenced in FIG. 3.

With reference to FIG. 5, the SPL routine 114 referenced in FIG. 4 includes a sequence of operations performed by the detector of FIG. 2 for sensing and displaying sound pressure. Since sound pressure levels typically produced by an automotive entertainment system have a wide acoustic range, routine 114 selectably amplifies the sensed analog signal from the SPL sensor with a predetermined gain setting (e.g., 1-4) (block 138). The amplified SPL analog signal from the SPL transducer, such as a microphone, converts this analog signal into a digital signal (block 140) for digital processing. The digital signal is converted into SPL value (dB) by referencing the SPL lookup table having a digital signal to SPL value conversion list for each selected gain setting (block 142).

The analog amplification is kept within an optimum operating range by changing the gain setting when the digital signal approaches either a minimum value or a maximum value in the SPL lookup table. Thus, a determination is made as to whether the digital signal is at or near a maximum value in a particular conversion list (block 144). Each gain setting and corresponding conversion list overlaps with the adjacent gain setting and its corresponding conversion list to avoid exceeding the operating range of the analog amplification of the sensed analog signal. If a table maximum threshold is sensed in block 144, then a further determination is made as to whether the minimum available gain setting is currently selected (block 146). If not, an opportunity exists to lower the gain by decrementing the gain setting by one (block 148).

If not at the table maximum threshold in block 144, then a further determination is made as to whether the digital signal is at a table minimum threshold (block 150). If so, then a further determination is made as to whether the maximum gain setting is currently selected (block 152). If not, an opportunity exists to increase the gain by incrementing the gain setting by one (block 154).

After the gain setting has been evaluated and adjusted as necessary in blocks 144-154, the SPL peak hold cap is discharged with a DUMP command to enable the SPL circuitry to adjust for the next reading (block 156). Also, the SPL value is displayed in a preselected format. If in a standard number format ("NUM STD (DB)") (block 158), then the running average of the preceding eight readings are updated on the display in numeric characters (block 160). Else, if in peak number format ("NUM PEAK") (block 162), then the last two readings are averaged and displayed if larger than the previously displayed value (block 164). Else, if in low bar graph format of 70-104 dB ("BAR LOW") (block 166), then for each second reading, the last four readings are averaged and displayed as a bar graph on the display scaled for 70-104 dB (block 168). Else if in high bar graph format of 70-138 dB ("BAR HIGH") (block 170), then for each second reading, the last four readings are averaged and displayed as a bar graph on the display scaled for 70-138 dB (block 172). After one of the respective four formats is displayed, routine 114 returns for continued sweeps and processing of alerts and SPL readings.

Figure 6:
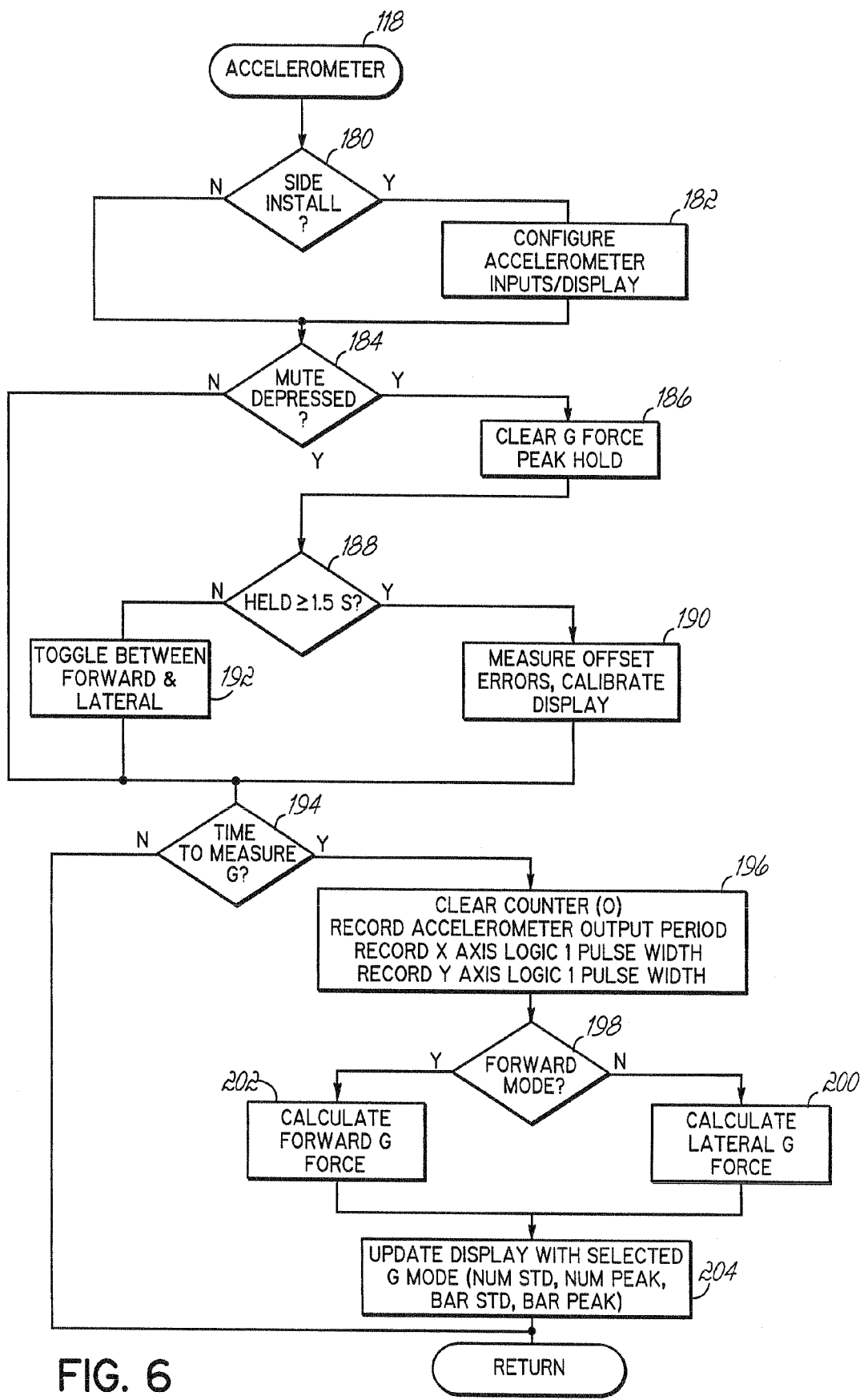
FIG. 6 is a flow chart for the sequence of operation for accelerometer display referenced in FIG. 4.

With reference to FIG. 6, the accelerometer routine 118 of FIG. 4 is depicted for sensing and displaying vehicle parameters derived from lateral or longitudinal acceleration. In some applications, users prefer to install the detector on its lateral side rather than on its bottom, for instance for mounting against a vertical surface in the vehicle. Consequently, routine 118 advantageously accommodates this installation by first determining whether the detector has been mounted on its side ("SIDE INSTALL") (block 180). This determination may be made by referencing a stored user setting or factory installed value. Alternatively, the detector may sense a constant lateral acceleration of approximately 1 G force consistent with gravity. If side installed in block 180, then the accelerometer is configured for side installation. For example, the lateral acceleration capabilities may be disabled or noted as a vertical acceleration. Also, other display functions of the detector may be automatically altered to rotate characters for stacked viewing or to switch directions of a bar graph display (block 182).

Routine 118 responds to a mute button being depressed in block 184 by clearing a G force peak hold. A further determination is made as to whether the mute button has been held for an extended duration (e.g., held at least 1.5 seconds) (block 188), indicating a desire by the user for the detector to measure offset errors in the accelerometer, calibrate for the errors, and confirm the calibration to the user by displaying a calibration status (block 190). If the mute button was not held in block 188, then the acceleration mode is toggled between forward (longitudinal) and lateral. If the user only meant to clear peak hold by momentary depression of the mute button, the mute button may be depressed momentarily again to return to the previous axis (not shown).

The accelerometer has a predetermined sample rate. Consequently, a determination is made with reference to an internal clock or by sensing the signal from the accelerometer as to whether it is time to read or measure the current acceleration (G) (block 194). If so, an acceleration counter is cleared that is used to trigger the next reading when reaching a threshold corresponding to the accelerometer output period. The accelerometer output period is recorded for use in calculating a pulse duty cycle that corresponds to acceleration. The X axis and Y axis pulse width signals are sensed and recorded by referencing the counter, which in the illustrative embodiment comprises a logic 1 wherein the pulse width is defined between a rising and failing edge (block 196).

With the readings stored for both the X axis (forward, longitudinal) and the Y axis (lateral), then a determination is made as to whether forward mode has been selected (block 198). If so, the forward G force is calculated by looking up the sensed pulse width in the acceleration lookup table. If not forward mode in block 198, then the lateral G force is calculated from the acceleration lookup table (block 202). Then the G force is displayed in the selected display format (e.g., NUM STD, NUM PEAK, BAR STD, BAR PEAK). After block 204, or if not time to measure the G back in block 194, routine 118 returns for additional sweeps and processing for alerts and acceleration readings.

In use, the detector 16 is set to a pilot mode for sound pressure level (SPL) and/or acceleration. The detector 16 sweeps with a front end portion 18 electromagnetic frequencies to receive signals characteristic of police traffic surveillance devices (e.g., RF band, laser). In response to the back end portion 20 detecting a received signal, the controller 34 initiates an alert on the display 24 and the speaker 54. When no alert is necessary, the controller 34 receives an SPL signal from music or road noise from SPL circuitry 60 and adjusts the gain setting to the SPL circuitry 60. An economical microphone 58, similar to those used in cordless telephones, senses the SPL and an operational amplifier 84 amplifies the SPL signal from the microphone 58 to a level suitable for input to an analog-to-digital converter, either discrete or integral to the microcontroller 34, prior to digital processing and display. To obtain a larger dynamic range of 75 dB, gain resistors are switched to maintain the signal in the proper operating range of the analog-to-digital converter. The approach leads to an economical SPL capability for less than $1.00 in variable cost to each detector 16.

The SPL signal is converted to a selected display format by the controller 34 and displayed on display 24. For example, four SPL modes may be provided in one exemplary embodiment of the invention. In such an embodiment, a numeric averaged meter mode displays SPL in a range covering 70 to 145 dB that is filtered for display similarly to C weighting. A numeric peak meter mode displays the peak SPL until cleared by depression of the mute button 46 or until the detector 16 is turned off. A low bar graph mode displays SPL in a range of 70 to 115 dB, which is the listening range for most users. For seven alphanumeric segments having a five-by-seven pixel, each pixel illuminated corresponds to a 1 dB increment. A high bar graph mode display SPL in a range of 70 to 145 dB, which advantageously alerts a user to SPL that may damage the ears. For the same alphanumeric segments, each pixel corresponds to a 2 dB increment.

Alternatively or in addition to SPL modes, the controller 34 may receive acceleration signals in longitudinal and lateral axes from an accelerometer 64 and display the value in the selected display format. Thus, car enthusiasts are able to see how fast their cars can go and how quickly they can accelerate. For example, traditional measures of automobile performance may be displaced by calculating a 0 to 60 m.p.h. time and a quarter mile time based on the longitudinal acceleration.

As an example, an exemplary implementation of the detector 16 may include six pilot modes for various acceleration-based calculations that may be displayed. In such an implementation, a numeric forward acceleration mode displays acceleration and deceleration in numeric form. The mode is capable of displaying increments of 1/100 of a G force. A plus (+) symbol indicates acceleration and a minus (−) sign indicates deceleration. A numeric lateral acceleration mode displays lateral acceleration in increments of 1/100 of a G force, with a plus (+) sign indicating a leftward acceleration and a minus (−) sign indicating a rightward acceleration. Switching between forward and lateral acceleration modes is accomplished by pressing the mute button 46 on the detector 16 when in either pilot mode. A bar graph forward acceleration mode has the 0 G point at the leftmost alphanumeric segment with an increase in acceleration increasing to the right. A plus (+) sign indicates acceleration and a minus(−) sign indicates deceleration. A bar graph lateral acceleration mode has the 0 G point centered, with leftward acceleration being represented by a leftward bar graph and with rightward acceleration being represented by a rightward bar graph. In 0-to-60 m.p.h. time mode, the time required for the vehicle to accelerate from a stop to 60 miles per hour is calculated and then displayed in numeric form. In quarter mile time mode, the detector 16 displays the time that it takes for the vehicle to traverse a quarter mile distance. The detector 16 is placed in this mode and the mute button 46 is depressed when the user is ready. As soon as the detector 16 senses acceleration, a clock timer is started. The detector 16 integrates the acceleration to calculate the velocity and integrates the velocity to calculate the distance. When the distance equals a quarter mile, the timer is stopped and the time displayed. A user calibration mode is used for the acceleration modes wherein the user positions the vehicle on flat ground and depresses the mute button 46 for more than two seconds, calibrating the detector 16 for 0 G force.

Figure 7:
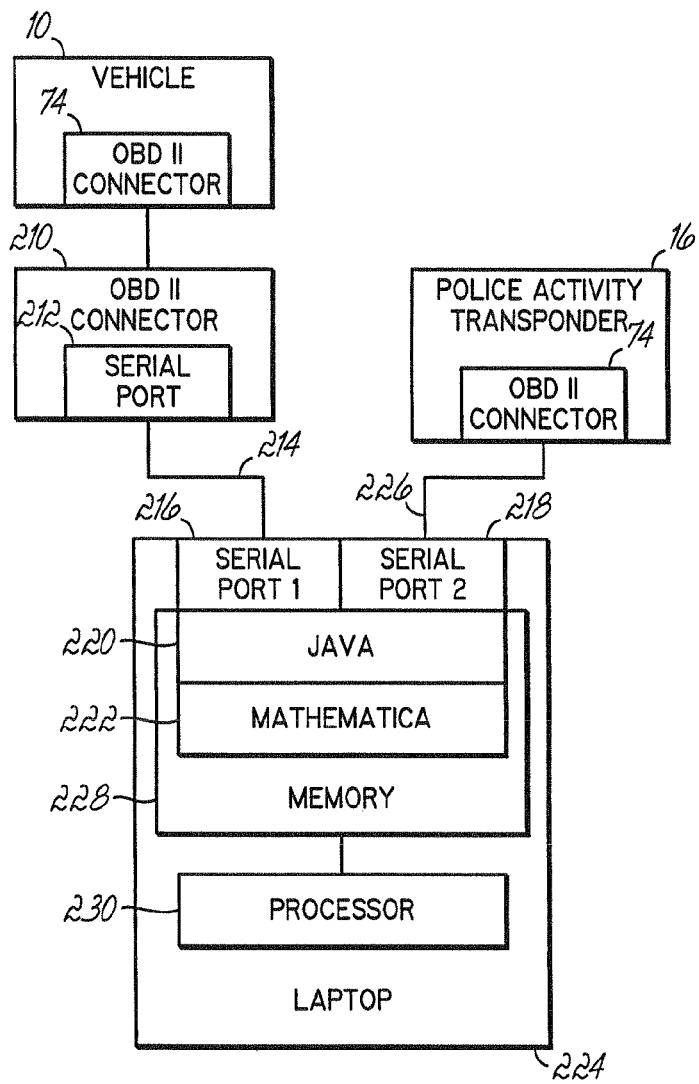
FIG. 7 is a block diagram of a prototype embodiment of the present invention.

Turning now to FIG. 7, a block diagram of a prototype embodiment of the present invention incorporating the variable sensitivity mode feature is illustrated. As depicted, a vehicle 10 manufactured with an engine management system with an OBD system 74 makes vehicle data, such as current vehicle speed data, available.

An OBDII interface 210, such as one manufactured by Multiplex Engineering, is connected to the OBD system 74. The Multiplex Engineering T016-002 or T016-003 interfaces are capable of communication using all three OBDII protocols discussed above. Interface 210 provides the capability to read vehicle data using any one of the three protocols through serial port 212.

A laptop personal computer (PC) 224, containing two serial ports, 216, 218, is connected to the interface 210 and detector 16, through serial cables 214, 226.

Laptop PC 224 executes program code configured to read vehicle data, calculate an attenuation value, and send the attenuation value to detector 16, thereby reducing the sensitivity of the detector. This attenuation value directly controls the detector sensitivity in real time.

As depicted, the program code is stored in memory 228 and executed by processor 230 to read the speed and calculate the attenuation. The program code is written in *Mathematica* software 222, with a Java interface 220 for controlling the serial ports. *Mathematica* may be purchased from Wolfram Research, Inc., 100 Trade Center Drive, Champaign, Ill. 61820, and may be found online at: www.wolframrcom. However, one skilled in the art will recognize that other code written using other software packages could provide similar functionality without departing from the spirit of the invention.

As such, the program uses two serial ports 216, 218, one to read vehicle data from the OBDII interface 210, and one to write data to the detector 16. As coded, vehicle speed data is read approximately every second, and averaged to eliminate false alarms due to random noise suggesting unrealistic accelerations and decelerations of the vehicle. As will be appreciated by of ordinary skill in the art, a variety of mathematical functions may be used to achieve a desirable speed versus attenuation relationship. When properly configured, false alarms to signals, such as those from door openers at slow speeds, will be eliminated, while providing full sensitivity to law enforcement signals at higher speeds.

While the embodiment of FIG. 7 illustrates a feature of the present invention, it is not practical for the everyday user. Yet another prototype embodiment of the present invention comprises a microprocessor housed in a stand alone box with two LEDs and a liquid crystal display (LCD). Such a stand alone box takes the place of PC 224 shown in FIG. 3. The microprocessor communicates with an OBDII interface, calculates an attenuation value based on available speed data, and sends the attenuation value to a detector for use in providing a variable speed sensitivity mode, as well as other features. Additional features include 0 to 60 mile per hour and quarter mile time measurements commonly used for vehicle performance comparisons. The microprocessor is also capable of reading available rpm data and illuminating the LEDs to provide shift point indications to a user. It is contemplated that a production embodiment of this prototype may comprise a small circuit board with an on-board microprocessor incorporated into an OBDII connector. As such, a production embodiment would provide an interface to the vehicle, gather data, and send the data to a detector for display.

An integrated embodiment such as that illustrated in FIG. 2 is also contemplated for commercial production. Turning again to FIG. 2, in this commercial embodiment, OBDII interface 72 decodes the vehicle 10 data available through the vehicle OBD system 74 and provides the data to the detector 16 thereby facilitating enhanced features and additional functionality. As contemplated, OBDII interface 72 is capable of communication using all three OBDII protocols discussed herein before. Detector 16 also contains a memory 38 for storing program code that is executed by controller 34 to provide enhanced features and additional functionality. Controller 34 may be an embedded processor, such as a reduced instruction set computer (RISC) or RISC processor, programmed in C.

For example, detector 16 may be configured to provide functionality that is similar that of the laptop PC 224 and OBDII interface 210 shown in FIG. 7. Thus, such a configuration of detector 16 would allow variable speed sensitivity, as well as other features of the present invention.

Speed data may also be used to measure 0 to 60 mile per hour and quarter mile times. These are often used for comparison purposes when comparing vehicle performance.

Figure 8:
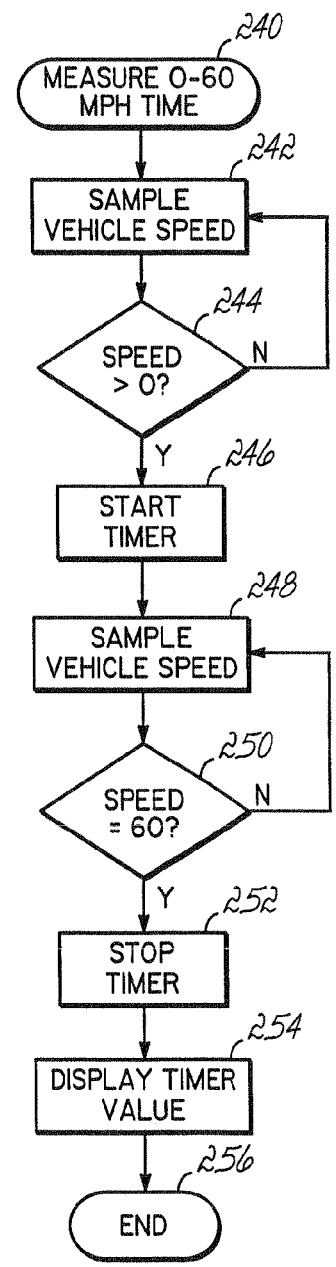
FIG. 8 is a flow chart for a program for measuring a 0 to 60 mph time.

FIG. 8 is a flow chart for a program executed by controller 34 for measuring a 0 to 60 mile per hour time. To activate a 0 to 60 mile per hour function, a user might press a button, or throw a switch, on keypad 76 to start the measurement and thus, the program begins in step 240. In step 242, the controller 34 monitors the vehicle speed data available through the OBD system 74 or IVDB. Next, in step 244, a comparison is made to determine whether the vehicle speed has exceeded zero, indicating that the vehicle has started to accelerate. If the vehicle has not begun accelerating, control is looped backed to sampling vehicle speed data in step 242. However, if the vehicle has begun accelerating, a timer, such as a timer in controller 34, is started in step 246. Sampling the vehicle speed data resumes in step 248. Next, in step 250, another comparison is made to determine whether the vehicle has reached 60 mph. If the vehicle has not reached 60 mph, control is passed back to step 248. However, if the vehicle has reached 60 mph, the timer is stopped in step 252. The value of the timer, representing the 0 to 60 mph time, is then sent to display 24 for display in step 254, and the program ends in step 256.

Figure 9:
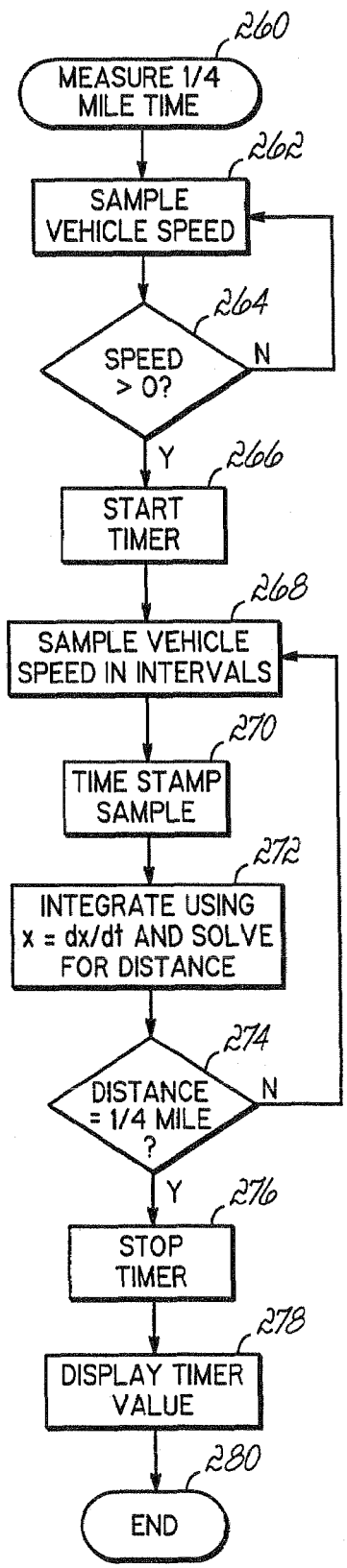
FIG. 9 is a flow chart for a program for measuring a quarter mile time.

Referring now to FIGS. 2 and 9, a quarter mile time may also be measured. To measure a quarter mile time, a user might also press a button, or throw a switch, on keypad 76 to start the measurement, and thus a program 260 for measuring a quarter mile time would commence. Once again in step 262, the controller 34 monitors the vehicle speed data available through the OBD system 74 or IVDB. Next, in step 264, a comparison is made to determine whether the vehicle speed has exceeded zero, indicating that the vehicle has started to accelerate. If the vehicle has not begun accelerating, control is looped backed to sampling vehicle speed data in step 262. However, if the vehicle has begun accelerating, a timer, such as a timer in controller 34, is started in step 266. Next, in step 268, the controller 34 begins sampling the speed data in small time intervals, e.g., between 50 and 100 milliseconds. Each sample is time stamped using the timer in step 270. In step 272, each time stamped sample is integrated, applying an equation that relates distance to speed and time, and thus the distance traveled is calculated. In step 274, if the distance does not equal a quarter mile, sampling continues at step 268. However, if the distance equals a quarter mile in step 274, the timer is stopped in step 276. Thus, the timer value represents the quarter mile time. The timer value is then sent to display 24 for display in step 278 and the program ends in step 280.

By virtue of the foregoing, a detector 16 detects and provides additional sensing and display of at least one vehicle condition (e.g., SPL, acceleration) without impairing detection of RF and/or laser signals characteristic of police traffic surveillance devices. Moreover, the detector 16 is able to use vehicle information or data available through the an OBDII system to provides enhanced functionality and additional features. Thereby, the detector 16 is capable of providing valuable information to the user without the additional expense and inconvenience of integrating separate displays.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A police activity transponder comprising:
    a receiver section receiving signals generated in the context of law enforcement activity, the sensitivity of the receiver section to a law enforcement signal varying in relation to vehicle speed data; and
    a warning section responding to the receiver section and providing a warning if a received signal correlates to a law enforcement signal;
    the receiver section being responsive to vehicle speed data derived from a position determining circuit.

2. The police activity transponder of claim 1 wherein the receiver section receives electromagnetic radar signals in a radar band.

3. The police activity transponder of claim 1 wherein the receiver section receives signals carried in the visible or infrared spectrum.

4. The police activity transponder of claim 1 further comprising an interface reading vehicle speed data from a host vehicle.

5. The police activity transponder of claim 4 wherein the interface is an OBDII compliant interface.

6. The police activity transponder of claim 4 wherein the interface is an IVBD compliant interface.

7. The police activity transponder of claim 1 further comprising an interface reading the vehicle speed data from a position determining circuit in a host vehicle.

8. The police activity transponder of claim 7 wherein the interface is an OBDII compliant interface.

9. The police activity transponder of claim 7 wherein the interface is an IVBD compliant interface.

10. The police activity transponder of claim 1 wherein the warning section is a visible display that makes visible warnings.

11. The police activity transponder of claim 1 wherein the warning section is an audio speaker that makes audible warnings.

12. The police activity transponder of claim 1 further comprising a position determining circuit.

13. A police activity transponder comprising:
    a receiver section receiving signals generated in the context of law enforcement activity; and
    a warning section responding to the receiver section and providing a warning if a received signal correlates to a law enforcement signal, the warning delivered by the warning section varying in relation to vehicle speed data;
    the warning section being responsive to vehicle speed data derived from a position determining circuit.

14. The police activity transponder of claim 13 wherein the receiver section receives electromagnetic radar signals in a radar band.

15. The police activity transponder of claim 13 wherein the receiver section receives signals carried in the visible or infrared spectrum.

16. The police activity transponder of claim 13 further comprising an interface reading vehicle speed data from a host vehicle.

17. The police activity transponder of claim 16 wherein the interface is an OBDII compliant interface.

18. The police activity transponder of claim 16 wherein the interface is an IVBD compliant interface.

19. The police activity transponder of claim 13 further comprising an interface reading the vehicle speed data from a position determining circuit in a host vehicle.

20. The police activity transponder of claim 19 wherein the interface is an OBDII compliant interface.

21. The police activity transponder of claim 19 wherein the interface is an IVBD compliant interface.

22. The police activity transponder of claim 13 wherein the warning section is a visible display that makes visible warnings.

23. The police activity transponder of claim 13 wherein the warning section is an audio speaker that makes audible warnings.

24. The police activity transponder of claim 13 further comprising a position determining circuit.

25. A police activity transponder comprising:
    a receiver section receiving signals generated in the context of law enforcement activity;

a vehicle speed circuit obtaining vehicle speed data derived from a position determining circuit;

a clock section tracking the passage of time;

a display displaying a time for acceleration to a given speed; and, a processor for processing code containing a routine for monitoring the clock section in relation to vehicle speed data and computing the time taken to reach the given speed to be displayed by the display.

26. The police activity transponder of claim 25 further comprising an interface reading vehicle speed data from a host vehicle.

27. The police activity transponder of claim 26 wherein the interface is an OBDII compliant interface.

28. The police activity transponder of claim 26 wherein the interface is an IVBD compliant interface.

29. The police activity transponder of claim 25 further comprising an interface reading the vehicle speed data from a position determining circuit in a host vehicle.

30. The police activity transponder of claim 29 wherein the interface is an OBDII compliant interface.

31. The police activity transponder of claim 29 wherein the interface is an IVBD compliant interface.

32. The police activity transponder of claim 25 further comprising a position determining circuit.

33. The police activity transponder of claim 25 wherein said processor computes a zero to sixty mile per hour time and causes said zero to sixty mile per hour time to be displayed by the display.

34. A police activity transponder comprising:
a receiver section receiving signals generated in the context of law enforcement activity;

a vehicle speed circuit obtaining vehicle speed data derived from a position determining circuit;

a clock section tracking the passage of time;

a display displaying a time for traveling a given distance; and, a processor for processing code containing a routine for monitoring the clock section in relation to vehicle speed data and computing the time taken to travel the given distance to be displayed by the display.

35. The police activity transponder of claim 34 further comprising an interface reading vehicle speed data from a host vehicle.

36. The police activity transponder of claim 35 wherein the interface is an OBDII compliant interface.

37. The police activity transponder of claim 35 wherein the interface is an IVBD compliant interface.

38. The police activity transponder of claim 34 further comprising an interface reading the vehicle speed data from a position determining circuit in a host vehicle.

39. The police activity transponder of claim 38 wherein the interface is an OBDII compliant interface.

40. The police activity transponder of claim 38 wherein the interface is an IVBD compliant interface.

41. The police activity transponder of claim 34 further comprising a position determining circuit.

42. The police activity transponder of claim 34 wherein the display displays a time to travel a quarter mile and the processor computes a quarter mile time for display by the display.

43. A police activity transponder comprising:
a receiver section receiving signals generated in the context of law enforcement activity;

a vehicle speed circuit obtaining vehicle speed data derived from a position determining circuit;

a display displaying vehicle speed; and, a processor for processing code containing a routine for reading the vehicle speed data and sending the vehicle speed data to the display for display.

44. The police activity transponder of claim 43 further comprising an interface reading vehicle speed data from a host vehicle.

45. The police activity transponder of claim 44 wherein the interface is an OBDII compliant interface.

46. The police activity transponder of claim 44 wherein the interface is an IVBD compliant interface.

47. The police activity transponder of claim 43 further comprising an interface reading the vehicle speed data from a position determining circuit in a host vehicle.

48. The police activity transponder of claim 47 wherein the interface is an OBDII compliant interface.

49. The police activity transponder of claim 47 wherein the interface is an IVBD compliant interface.

50. The police activity transponder of claim 43 further comprising a position determining circuit.

* * * * *